(12) United States Patent
Surmann et al.

(10) Patent No.: US 9,295,196 B2
(45) Date of Patent: Mar. 29, 2016

(54) ADJUSTABLE STALK SUPPORT DEVICE FOR HARVESTING STALKY STEM MATERIAL

(75) Inventors: Klemens Surmann, Ahlen (DE); Andre Hemmesmann, Sassenberg (DE); Robert Sonnen, Beckum (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 243 days.

(21) Appl. No.: 13/988,763

(22) PCT Filed: Nov. 11, 2011

(86) PCT No.: PCT/EP2011/005684
§ 371 (c)(1),
(2), (4) Date: Jun. 20, 2013

(87) PCT Pub. No.: WO2012/069144
PCT Pub. Date: May 31, 2012

(65) Prior Publication Data
US 2014/0059994 A1    Mar. 6, 2014

(30) Foreign Application Priority Data

Nov. 22, 2010    (DE) .......................... 10 2010 051 887

(51) Int. Cl.
*A01D 45/02*    (2006.01)
*A01D 57/22*    (2006.01)
*A01D 57/01*    (2006.01)

(52) U.S. Cl.
CPC .............. *A01D 45/021* (2013.01); *A01D 57/01* (2013.01); *A01D 57/22* (2013.01)

(58) Field of Classification Search
USPC ............... 56/14.3, 17.3, 94, 119, 121.42, 364
See application file for complete search history.

(56) References Cited

U.S. PATENT DOCUMENTS 2,854,806 A * 10/1958 Slavens ........................... 56/103
3,398,515 A *  8/1968 Ash ........................ A01D 45/10
                                                                  56/63

(Continued)

FOREIGN PATENT DOCUMENTS

DE      102006001383 A1    7/2007
EP          1106049 A1    6/2001

(Continued)

*Primary Examiner* — Alicia Torres
(74) *Attorney, Agent, or Firm* — Gudrun E. Huckett

(57) ABSTRACT

An attachment device for harvesting stalky stem material is provided with stem dividers; cutting devices cutting the stalky stem material; conveying devices conveying the cut stalky stem material; picking units distributed across a working width of the attachment device and provided with picking rollers and picking gaps to separate fruit from the stalks; milling devices associated with the picking units; and a device collecting and combining the fruit separated from the stalks. Drivable stalk supports are arranged in a travel direction of the attachment device upstream of the picking units and positioned vertically spaced relative to the picking units and to the cutting devices. Pivotable support arms support the stalk supports. The stalk supports are moved by the support arms in a longitudinal direction, with respect to the vertical position, and with respect to an attack angle, and are adjusted with respect to their rotary speed.

15 Claims, 11 Drawing Sheets

(56) References Cited

U.S. PATENT DOCUMENTS

| | | | |
|---|---|---|---|
| 3,596,447 A * | 8/1971 | Makeham et al. | 56/63 |
| 3,596,448 A | 8/1971 | Van Buskirk | |
| 5,377,479 A * | 1/1995 | Wilstrand et al. | 56/14.3 |
| 5,661,964 A * | 9/1997 | Paulson et al. | 56/64 |
| 5,787,696 A | 8/1998 | Wiegert et al. | |
| 6,062,011 A * | 5/2000 | Uhlending | A01D 57/022 56/119 |
| 7,047,717 B1 | 5/2006 | Wolters et al. | |
| 2010/0175356 A1 | 7/2010 | Kalverkamp et al. | |

FOREIGN PATENT DOCUMENTS

| | | |
|---|---|---|
| WO | 95/17807 A1 | 7/1995 |
| WO | 2007066161 A1 | 6/2007 |

\* cited by examiner

ADJUSTABLE STALK SUPPORT DEVICE FOR HARVESTING STALKY STEM MATERIAL

BACKGROUND OF THE INVENTION

The present invention concerns an attachment device for harvesting stalky stem material, in particular corn, comprising stem dividers, cutting devices for cutting off the stalky stem material, conveying devices for conveying the cut stalky stem material, a plurality of picking units distributed across the working width of the attachment device for separating fruit from the stalks, each having at least one picking roller and a picking gap correlated with the picking roller, one milling device for the stalks correlated with each one of the picking units, and a device for collecting and combining the cut-off fruit.

An attachment device of the aforementioned kind in the form of a corn harvester is disclosed in WO 95/17807. With the attachment device disclosed therein, it is possible to harvest stalky stem material sown in rows in that the harvester to which the attachment device is connected is moved precisely along the rows across the field. Only when accepting an increased loss of crop is it possible to harvest the stalky stem material with the known attachment device when less precisely aligned along the rows, or even independent of the rows.

It is an object of the present invention to provide an attachment device with which the losses of stalky stem material are reduced when the attachment device is not guided precisely along the rows of plants.

SUMMARY OF THE INVENTION

The object is solved for an attachment device of the aforementioned kind in that each of the picking units has associated therewith at least one drivable stalk support that is arranged in traveling direction upstream of the associated picking unit and that is arranged vertically spaced relative to the picking unit and to the cutting devices, wherein the stalk supports are arranged on one or several pivotable support arms and the stalk supports are movable in the longitudinal direction and/or with respect in their vertical position and/or with respect to their attack angle and/or are adjustable with regard to their rotary speed.

With the stalk support according to the invention, it is possible to support a plant stalk to be harvested at a greater spacing to the ground so that, by the attachment device that is moved into the material to be harvested, it is not completely or partially pressed down and run over.

By the drive action of the stalk support it is ensured that a stalk to be harvested continues to be supported even for an advancing movement of the harvesting machine, even though the relative position of the stalk of the material to be harvested changes in relation to the attachment device because of the advancing movement. The drivable stalk support is thus an active support member that can move its support point of the plant stalk on the stalk support by the driving action.

By arranging the stalk support upstream of the associated picking unit, a support of the plant stalk is possible before the plant stalk is engaged by the picking unit and processed. In this way, the support action is particularly effective and it is possible to utilize the drivable stalk support for moving the supported part of the plant stalk toward the picking unit.

Because of the vertical spacing of the drivable stalk support relative to the picking unit and also to the cutting devices, leverage forces can be produced that counteract bending and lateral displacement of a plant stalk by the stem divider and/or the cutting devices. In this context, the stalk supports can be arranged at a height where a good support action for the plant stalks results but where the plant stalks still have a sufficient strength in order to transmit the support forces, transmitted from the stalk support onto the plant, onto the stalk parts positioned underneath. The vertical spacing of the drivable stalk support to the picking unit and the cutting devices should therefore be at least half the height, or more, of the stem material to be harvested because at this height the strength of the stalk is still sufficient but useful support forces can be generated also. An effective support action at the upper tips of the corn plants is difficult because the plant stalk is too soft and flexible in this area and the corn plant threatens to tilt when a support action is provided in this area.

The stalk support is moveable in longitudinal direction and/or with respect to its vertical position and/or with respect to the attack angle and/or adjustable with regard to its rotary speed. The adjustability in longitudinal direction means that the stalk support is adjustable in the travel direction or in the pulling-in direction of the attachment device. As a result of the vertical adjustment the vertical spacing of the stalk support relative to the cutting devices and the picking unit is changed. In case of an adjustment of the attack angle, the spatial position of the stalk support is changed about a transverse axis. When adjusting the rotary speed, the circulating speed of the stalk support changes. Because of the adjustability of the aforementioned parameters, the stalk support is individually adaptable to the respective material to be harvested; the support action can be improved in this way. In this connection, it is conceivable that each stalk support by itself, but also several or all of the stalk supports, are adjustable jointly.

As a result, by the support of the plant stalks by means of the drivable stalk supports, it is possible to maintain the plant stalks longer in at least approximately upright position until they are engaged by the cutting devices of the attachment device and cut off. By means of the stalk supports it is also possible to correlate the plant stalks to a corresponding picking unit so that the plant, as a result of the support action, advances into the cutting area of the corresponding picking unit, is cut thereat, and then gripped by the picking unit and processed. In this way, the risk is reduced that plant stalks to be harvested will end up transversely to the infeed area of one or several picking units and thereby impair infeeding of the following plant stalks. Since the plant stalks are supported at least approximately in upright position by the drivable stalk support, a transverse positioning of the plant stalks in front of the infeed area of a picking unit is prevented.

According to one embodiment of the invention, in the travel direction of the attachment device the stem dividers are arranged upstream of the drivable stalk supports across their entire or at least part of their constructive length and the cutting devices are arranged downstream of the drivable stalk supports. The terms "upstream" and "downstream" mean that the corresponding components are spatially arranged such that plant stalks that are moving into the active area of the attachment device are first contacting the stem dividers, subsequently are engaged by the stalk support, and then are cut by the cutting devices.

When the attachment device is guided precisely along a row of plants such that the plant stalks are advancing precisely toward the cutting device, or when the corn plants have been sown by broadcast seeding or the attachment device is moved at a slant or transversely to a row of plants and a plant stalk advances precisely toward a cutting device, the plant stalks will not contact the stem dividers. This is an ideal situation without any problems in which the plant stalks are to be engaged only by the stalk supports before they are cut. A mandatory correlation of a plant stalk to a picking gap is not required in this ideal situation.

However, difficult situations arise when a plant stalk to be harvested is not advancing precisely toward a cutting device. In this case, the first contact of a plant stalk with the stem divider, because of its pointed shape, effects an unequivocal mandatory correlation of the respective plant stalk to a cutting device that is arranged downstream of the stem divider. Only after it has been determined by means of the stem divider during the advancing action of the attachment device into crop which cutting device will cut the plant stalk and which correlated picking unit will pick the corncobs, the plant stalks will reach the effective area of the stalk supports that will guide and support the plant stalk due to their spatial correlation to a cutting device and a picking gap to these processing devices. Only once the plant stalks are supported by the stalk supports are they cut by the correlated cutting device and supplied to the picking unit that is downstream of this cutting device. For a plant stalk that is not precisely advancing toward a cutting device, this results in the contact sequence: first contact with the stem divider for assignment to a cutting device, second contact with the stalk support or stalk supports, and subsequently, as a third contact, cutting the stalk.

This contact sequence however does not preclude that the respective contact phases can overlap. For example, a plant stalk may still be in contact with the stem divider when it is contacted for the first time by the stalk support or stalk supports and the plant stalk can also be cut while parts of the plant being cut are still in contact with the stem divider. The support action of the plant stalk at least during the cut, possibly even thereafter, is part of this invention.

In one embodiment of the invention, at least one of the stalk supports is drivable by a hydraulic or electric motor which is operatively connected with the stalk support and the supply line for the drive action supply of the motor with hydraulic or electric energy is positioned along a pivotable support arm. By means of electric or hydraulic motors it is possible to eliminate heavy drive shafts and gearboxes which would otherwise excessively load by a lever action the front axle of the carrying vehicle because of their arrangement at the front end of the attachment device. Moreover, electric or hydraulic drives are easily switchable and controllable from a remote operating position. The operative connection means that the hydraulic or electric motor drives directly or indirectly at least one stalk support.

According to one embodiment of the invention, the stalk support is arranged at a level above the infructescence of the stem material. By arrangement of the stalk support at this level, it is prevented that by the stalk support contacting the infructescence the latter is separated from the plant stalk and drops to the ground before having been engaged and transported away by the attachment device.

According to one embodiment of the invention, upon a conveying movement the stalk support moves the stem material supported by it toward the associated picking unit along a conveying path that is predetermined by the stalk support. The stalk support can be provided in particular with receiving pockets or other follower devices in which a plant stalk is supported and in which, upon a conveying movement of the stalk support, the plant stalk is moveable toward the correlated picking unit. The circulation path of the stalk support that, depending on the configuration, is embodied as a disk or chain conveyor is circular but also elliptical or designed to be circulating in other ways and the receiving pockets or follower devices define a conveying path along which the plant stalks can be guided that are supported by the stalk support. By guiding a plant stalk that is supported by the stalk support toward the picking unit during the period of time in which the plant stalk is supported by the stalk support, possible harvest losses are reduced and the supply of the plant stalks to the correlated picking unit is assisted in a meaningful way.

According to one embodiment of the invention, the stalk support and the conveying path defined by the stalk support are adjustable in their spatial position in relation to the correlated cutting device such that a plant stalk that is supported by the stalk support across the course of the conveying path, is supported during and after the cutting process by the cutting device. The correlated cutting device is that cutting device that cuts the plant stalk supported by the respective stalk support. Harvest losses and disturbances of the flow of material can be particularly prevented when the stalk support and the conveying path predetermined by it are adjusted such that the plant stalk to be cut is supported by the stalk support already before the cutting action; in this way, uncontrolled movements of the plant stalk shortly before the cut are prevented. This effect continues when the plant stalk remains supported during the cut and the plant stalk can be transported way in a controlled fashion and transferred to the picking unit when the support action is still maintained for a short period of time after the cut. The adjustment of the spatial position can be realized by adjustment of the vertical position, the length, and/or the attack angle; in addition, also the rotary speed can be adjusted appropriately.

According to one embodiment of the invention, the cutting devices and/or the conveying devices cover the entire or at least almost the entire working width of the attachment device in the travel direction. An at least almost complete coverage of the working width of the attachment device is to be understood as a coverage of at least 80% of the working width. With this configuration of the attachment device it is possible to utilize the attachment device for a row-independent harvest of the material to be harvested. Since the cutting devices and/or the conveying devices cover the entire working width of the attachment device in the travel direction, a stalk to be harvested can be engaged, cut and conveyed away at any location of the attachment device. It is then no longer required to cut and transport away a stalk to be harvested precisely at a determined cutting location correlated with an associated picking unit as is required in connection with the attachment devices that operate row-dependent. Since the plant stalks during cutting and conveying to the correlated picking unit are supported by a stalk support at the upper area of the plant stalk, conveying of the plant stalk transversely or slantedly to the pulling-in direction of the stem material is possible without increased harvest losses having to be accepted. In this way, a plant stalk can even be cut at a position that is remote in comparison to the conventional prior art and can be subsequently transported to the correlated picking gap without the plant stalks ending up transversely positioned in significant numbers and thereby blocking the material flow in the attachment device or being run across by the attachment device and thus being lost as result.

According to one embodiment of the invention, the stalk support is arranged in the pulling-in direction of the stem material into the attachment device behind the tip of a correlated stem divider. With this arrangement it is ensured that first the plant stalks standing in the field each are assigned by the stem dividers to a pulling-in area for a picking unit. A plant stalk that is impacted by a stem divider moves past it upon further advancing movement of the attachment device into the plant population with the major portion of the plant being either on the right side or left side of the stem divider. A plant stalk can also be impacted by the stem divider in such a way that the stalk is pushed more or less to the side; in this case, the plant stalk is then tilted into a more or less pronounced slanted position. In precisely this situation it is advantageous when immediately after the assignment of a plant stalk to a picking gap a slantedly positioned plant stalk is supported by the drivable stalk support in order to prevent a further lowering of the plant stalk into an increasingly slanted position down to a completely transverse position. In this connection, a plant stalk that begins to tilt is supported by the stalk support that is arranged in front of the correlated picking unit. Accordingly, as the attachment device advances, the following sequence can be observed in this embodiment of the invention:

By moving the stem divider into a plant population, at the tip of the stem divider it is determined whether the plant stalk is assigned to a picking unit to the right or to the left of the stem divider;

Immediately after this assignment, the plant stalk then reaches the active area of the drivable stalk support by means of which a correlated plant stalk is supported and held in an at least approximately upright position;

Subsequently, this plant stalk can be cut by the cutting devices and then supplied to the corresponding picking unit and processed.

With the afore described support action of the plant stalk by means of the stalk support, the plant stalks can no longer move so easily into a slanted or transverse position after they have been impacted by a stem divider. Morever, it is more easily possible to transport the cut stalk transversely or at a slant to the pulling-in direction of the material to be harvested into the attachment device. Accordingly, the attachment device must no longer be precisely guided along the row of plants of the material to be harvested; the plant stalk can also be cut at a position that is farther removed from the picking unit/picking gap and transported with support action to the picking unit without increased harvest losses or material blockage by transversely positioned plant stalks being observed. Handling of the attachment device is thus facilitated.

According to one embodiment of the invention, a picking unit has correlated therewith two oppositely driven stalk supports that each cover a partial working width of the attachment device to the right and to the left of the longitudinal center axis of the picking unit. The longitudinal center axis of the picking unit is defined by the picking gap. In this way, it is possible to realize the support function across a wide partial working width to both sides of a picking gap without having to accept excessively long transport distances. Each stalk support can supply stem material from its respective side of the longitudinal axis to the picking unit.

According to one embodiment of the invention, the envelope curves of the movement path of the two stalk supports overlap each other partially. Because of the partial overlap, gaps are avoided in which plant stalks would not be supported. Moreover, in this solution plant stalks cannot as easily drop out of the receiving pockets in the travel direction because the area to the front is blocked by the partially overlapping stalk supports.

According to one embodiment of the invention, the conveying speed of the stalk support is the same or greater than the advancing speed of the attachment device. In this embodiment of the attachment device it is avoided that a plant stalk that is supported by the stalk support assumes a position that is too slanted because of a lower conveying speed of the stalk support. Basically, it is desirable to hold a cut plant stalk, if possible, in its vertical position until it is engaged by the picking unit because for an increasingly slanted position of the plant stalk it becomes more and more difficult to hold in a controlled manner the plant stalk during its conveying movement. It must also be taken into account that crops of a very different nature are to be harvested with the attachment device. Corn plants as an example for stalky stem material can have a height between 2 m and 4 m with stalks of different thickness and corncobs of different weight and with more or less dense leaves. In order to be able to ensure under all conditions a conveying action as reliable as possible of the cut plant stalks in spite of these significant variances of the crops, the relative movements between the attachment device and the plant stalk to be harvested should be kept at a minimum after the cut. For this purpose, the here proposed configuration is provided.

According to one embodiment of the invention, the stalk support is embodied as a body of rotation provided with several receiving pockets. By embodying the stalk support as a body of rotation, the supporting and conveying functions of the stalk support can be combined with each other in an ideal manner. With a rotating circumferential movement of the stalk support it is possible to transport away already cut stalks, to transfer them to a transfer point and, after return along the backside of the stalk support, to receive a new plant stalk for support with a cycle time that stays the same. The stalk support can be designed as a rotating disk with a circular shape but it is also possible to design the body of rotation, for example, as a chain conveyor or belt conveyor with a movement path that is not circular. Because of the pocket-like configuration the supported plant stalks are engaged reliably and cannot drop easily out of the receiving pockets again.

In accordance with one embodiment of the invention, on the side of the receiving pockets that is trailing in the rotational direction a projection is provided which is formed to be leading in the rotational direction. With the embodiment of projections on the receiving pockets of the stalk support, individual receiving spaces are defined in which one or several plant stalks can be supported by one stalk support. With the embodiment of a projection, leading in the rotational direction, provided at a receiving pocket, the plant stalks that are located in the receiving pockets can be supported particularly well upon acceleration of the plant stalk in the conveying direction. A projection designed in this way engages upon rotational movement a plant stalk located in the receiving pocket from behind and supports it thereby more reliably. The projection can be, for example, designed in the form of a hook-shaped finger. A projection designed in this way protects the plant stalks received in a receiving pocket additionally from falling out of the receiving pocket transversely to the conveying direction of the stalk support.

According to one embodiment of the invention, the milling device has rotating knives that are arranged on a shaft that extends parallel to the picking gap and that project with their cutting edges into the circular envelope curve of one or several pulling-in rotors. Knives that are arranged in this way have been found to be very reliable, efficient, effective and disturbance-resilient, and can be combined easily with the proposed stalk support and pulling-in technology for the plant stalks proposed herein.

According to one embodiment of the invention, one or several stalk supports have one or several bodies of rotation that are driven in rotation about a vertical or at least approximately vertical axis of rotation. Due to the precisely vertical or at least approximately vertical axis of rotation, the bodies of rotation generate a conveying moment in a direction of action that is at a right angle to the axis of rotation and is then horizontally or at least approximately horizontally oriented.

The stronger the axis of rotation deviates from the vertical direction, the shorter the conveying moment in the horizontal direction for the same dimensions of the body of rotation.

The stalks that are supported by the stalk supports can be conveyed in sum by the bodies of rotation about their outer circumference in a direction opposite to the advancing direction of the harvester in the conveying direction of the individual pulling-in devices. The bodies of rotation in this way are not limited to a statically acting stalk support action but can convey in addition the supported stalks in the direction toward the conveying members of the attachment device. The continuous conveying action and removal transportation of the supported stalks prevents that, for increased advancing speeds of the harvester, in front of the stalk supports a dense package of pushed-together plant stalks and plant leaves is formed in which the plant stalks that are father removed from the stalk supports may be bent without reaching the follower area of the stalk supports. In the support area, instead, a controlled material flow is generated where, when the plant stalk contacts the stalk support, the engaged plant stalk is then conveyed out of the contact area in order to free the receiving area for the next plant stalk to be received. The risk of buckling plant stalks that are no longer engaged by the stalk support is thus significantly reduced.

It is expressly stated that the afore described embodiments of the invention are combinable individually, respectively, but also selectively in combination with each other, with the subject matter of the independent claim in as much as they are not depend on features of a different embodiment.

Further modifications and embodiments of the invention can be taken from the following description of the embodiments and the drawings.

BRIEF DESCRIPTION OF THE DRAWINGS

The invention will be explained with the aid of an embodiment in more detail. It is shown in.

DESCRIPTION OF PREFERRED EMBODIMENTS

Figure 1:
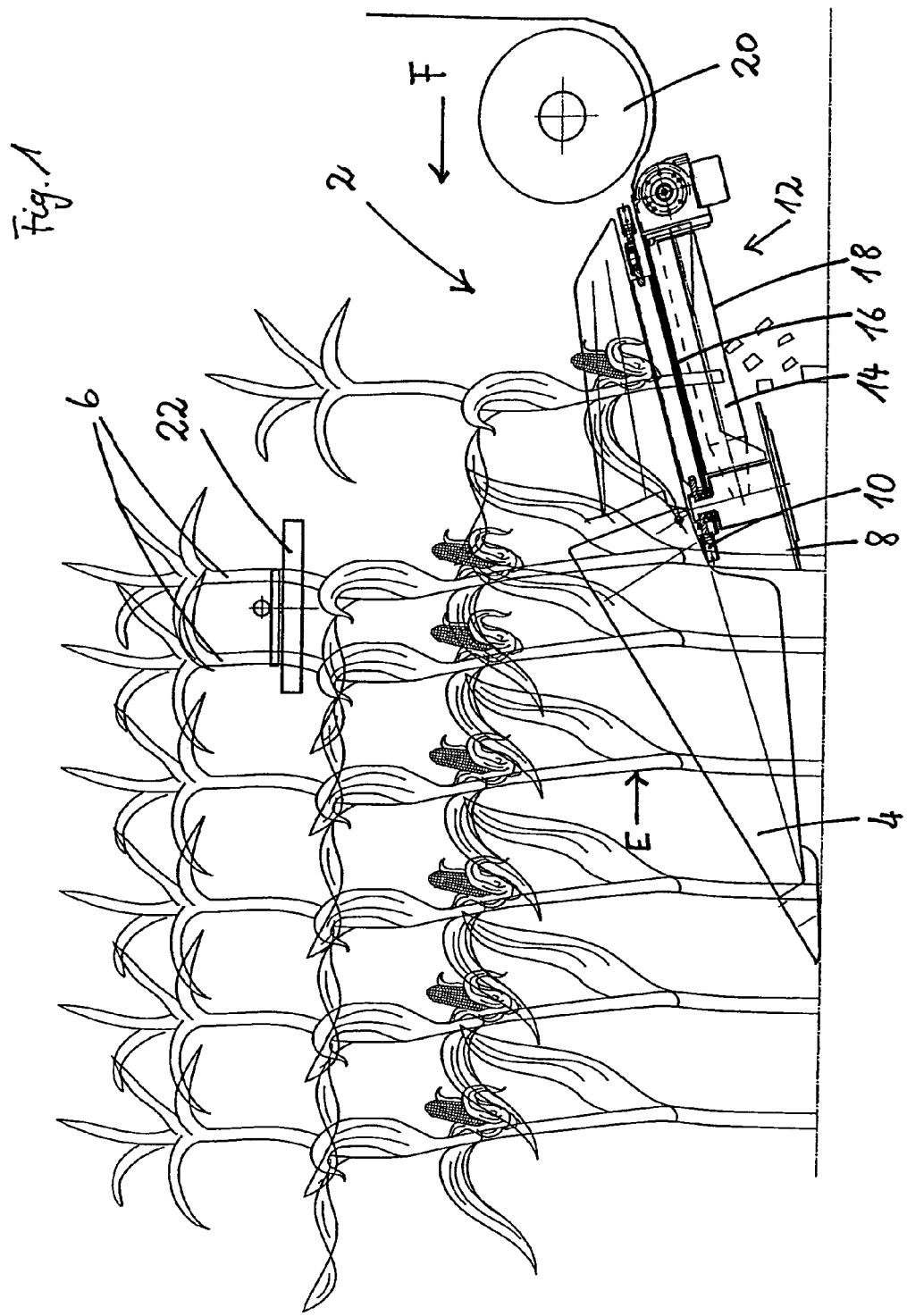
FIG. 1 a side view of the attachment device.
Figure 2:
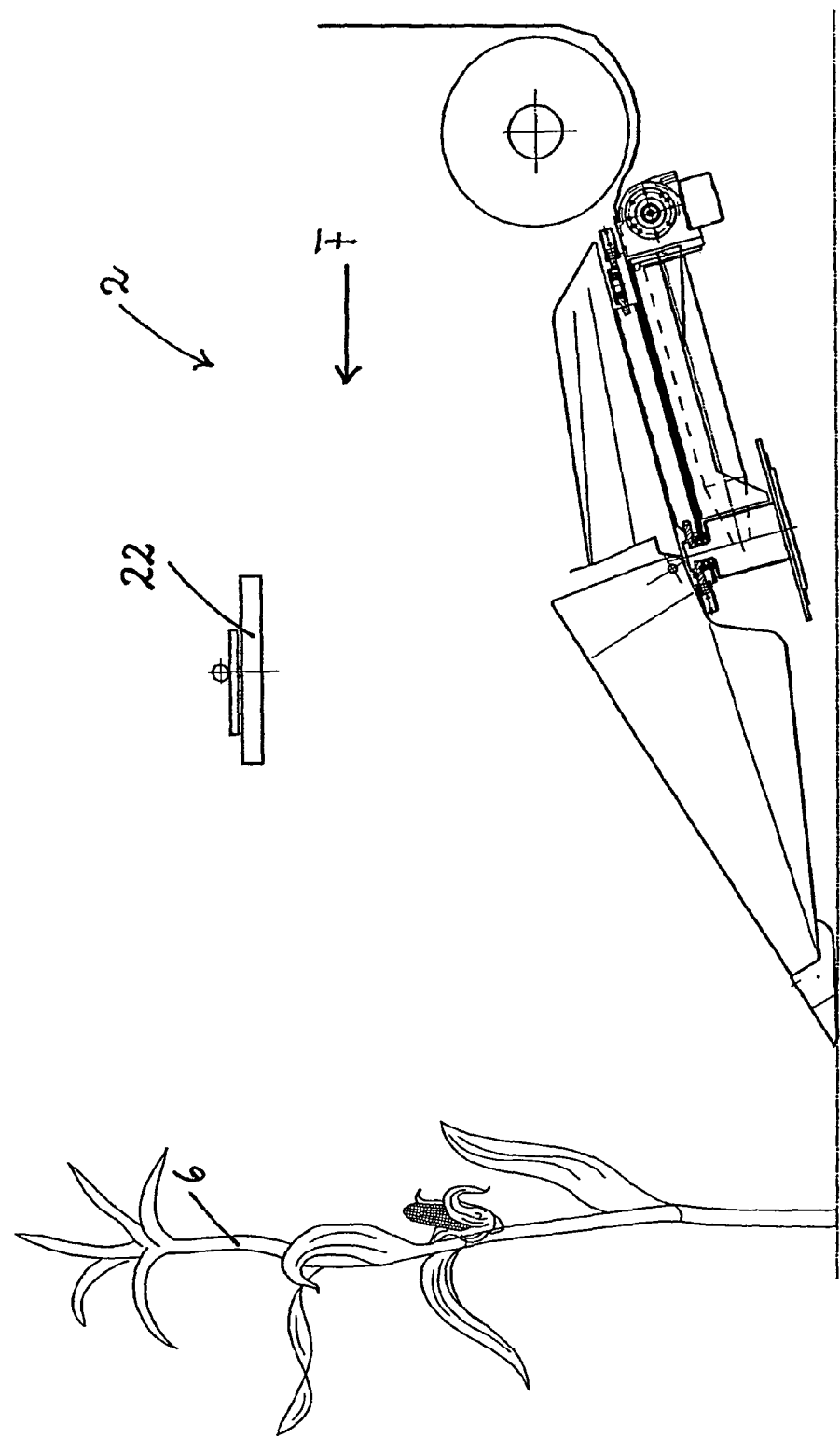
FIGS. 2-5 the sequence of pulling in a plant stalk into the attachment device.

In FIG. 1 an attachment device 2 is shown in a side view. The attachment device 2 is driven in travel direction F into the crop of stem material, in the embodiment a cornfield. In traveling direction F, at the leading end of the attachment device 2 the stem divider 4 is provided by means of which the stalks of the stem material 6 when contacting the stem divider 4 are forced in the transverse direction into a picking unit 12 arranged to the right or to the left downstream of the stem divider 4. An attachment device 2 may be provided with several picking units arranged adjacent to each other in order to achieve greater working widths, for example, 6, 8, 10 or more picking units 12 whose pulling-in areas are separated from each other by stem dividers 4, respectively. The plant stalks are cut close to the ground by the cutting device 8, then the stalks are gripped by a conveying device 10, and are moved in the pulling-in direction E into the attachment device 2.

When the plant stalks reach the active area of the picking units 12, the plant stalk is gripped by one or several picking rollers 14 and pulled downwardly. As this is done, the plant stalk is milled by the milling device 18. The milling device 18 can be comprised of stationary or rotating knives or of knife bars that are placed onto the picking rollers 14. The infructescence of a plant, in the embodiment the corncobs, are ripped off the plant stalk at the picking gap 16 because the picking gap 16 is so narrow that the picking rollers 14 can pull the stalk through the picking gap 16 but not the corncobs. The ripped-off corncobs are then conveyed by the conveying device 10 into the area of the collecting device 20, in the embodiment a screw conveyor.

In the travel direction F, a stalk support 22 is arranged upstream of the picking unit 12. The stalk support 22 is secured in its position by means of an appropriate holder and connected therewith to the remainder of the attachment device 2 and, for reasons of simplifying the drawing, is not shown in detail. On the holder, also the technology for the drive of the stalk support 22 can be mounted. The stalk support 22 is spaced vertically relative to the picking unit 12 and the cutting device 8. A working height of a spacing of at least one meter relative to the ground is advantageous. In the pulling-in direction E of the stem material 6 into the attachment device 2, the stalk support 22 is arranged downstream of the tip of the stem divider 4. In the embodiment, the vertical spacing of the stalk support 22 relative to the remaining members of the attachment device 2 is so large that it is higher than the infructescence of the stem material 6 to be harvested. In FIG. 1, it is shown that two plant stalks are provided in the active area of the stalk support 2.

Figure 3:
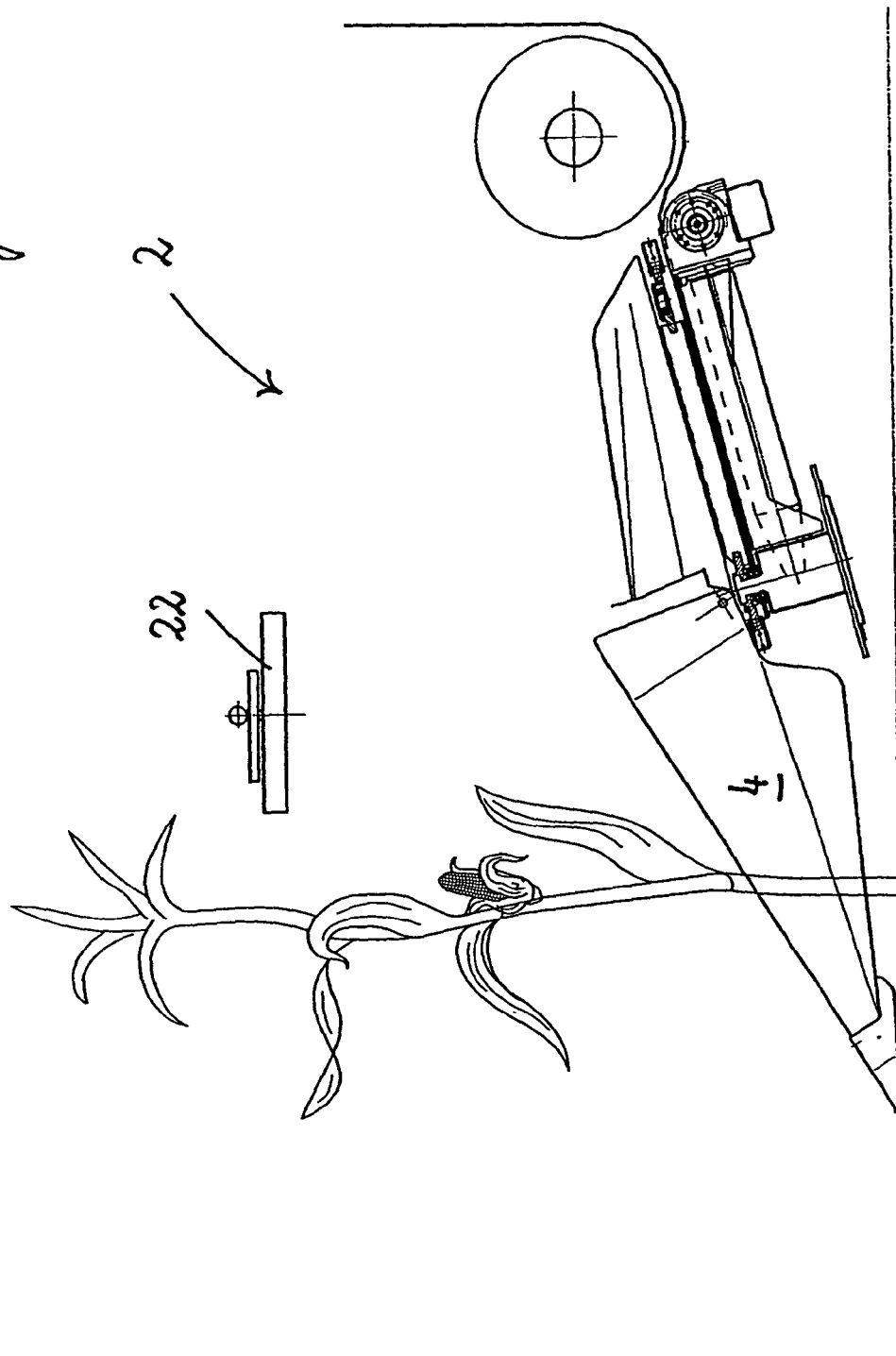

In FIGS. 2-5, it is shown how the plant stalk is entering the attachment device 2. The attachment device 2 is moved in FIG. 2 in the travel direction F toward a plant stalk of the stem material 6. In FIG. 3, the attachment device 2 has moved with the divider tip of the stem divider 4 already past the plant stalk. In this way, the plant stalk is assigned to the pulling-in area of a certain picking unit 12. The plant stalk has however not yet been engaged by the stalk support 22.

Figure 4:
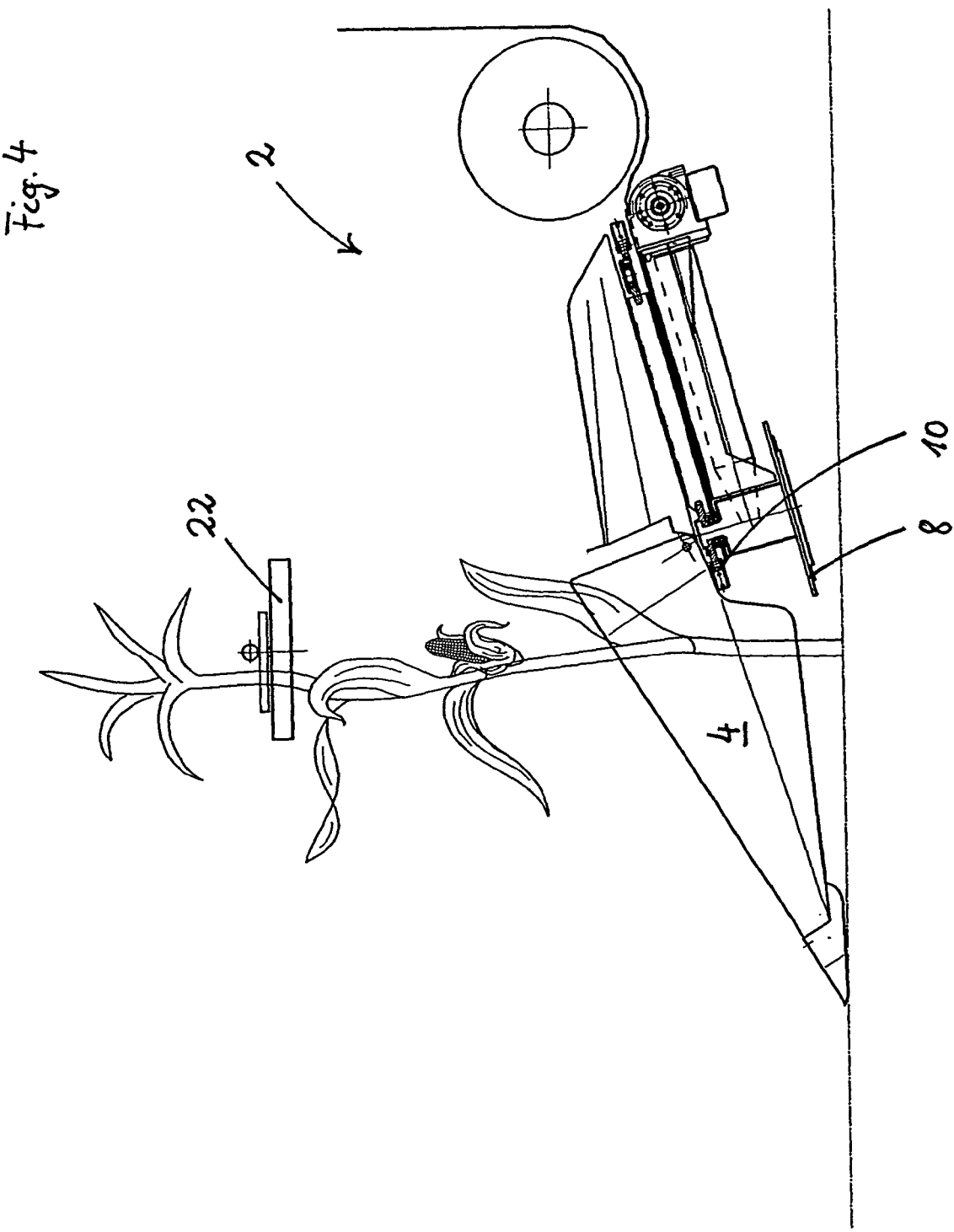

In FIG. 4, the attachment device 2 has been moved farther in the travel direction F so that in the meantime the plant stalk has been engaged by the leading area of the stalk support 22 and is supported. Upon further advancing movement of the attachment device 2, the upper part of the plant stalk is conveyed by the rotational movement of the stalk support 22 in the upper area father in the pulling-in direction E and optionally also toward the picking unit 12 while the lower area of the stalk has reached the active area of the cutting device 8. The latter cuts off the stalk close to the ground, depending of the vertical adjustment of the attachment device 12. Immediately thereafter, the stalk reaches the active area of the conveying device 10 and the picking unit 12 so that the plant stalk is safely engaged and requires no further support action.

Figure 5:
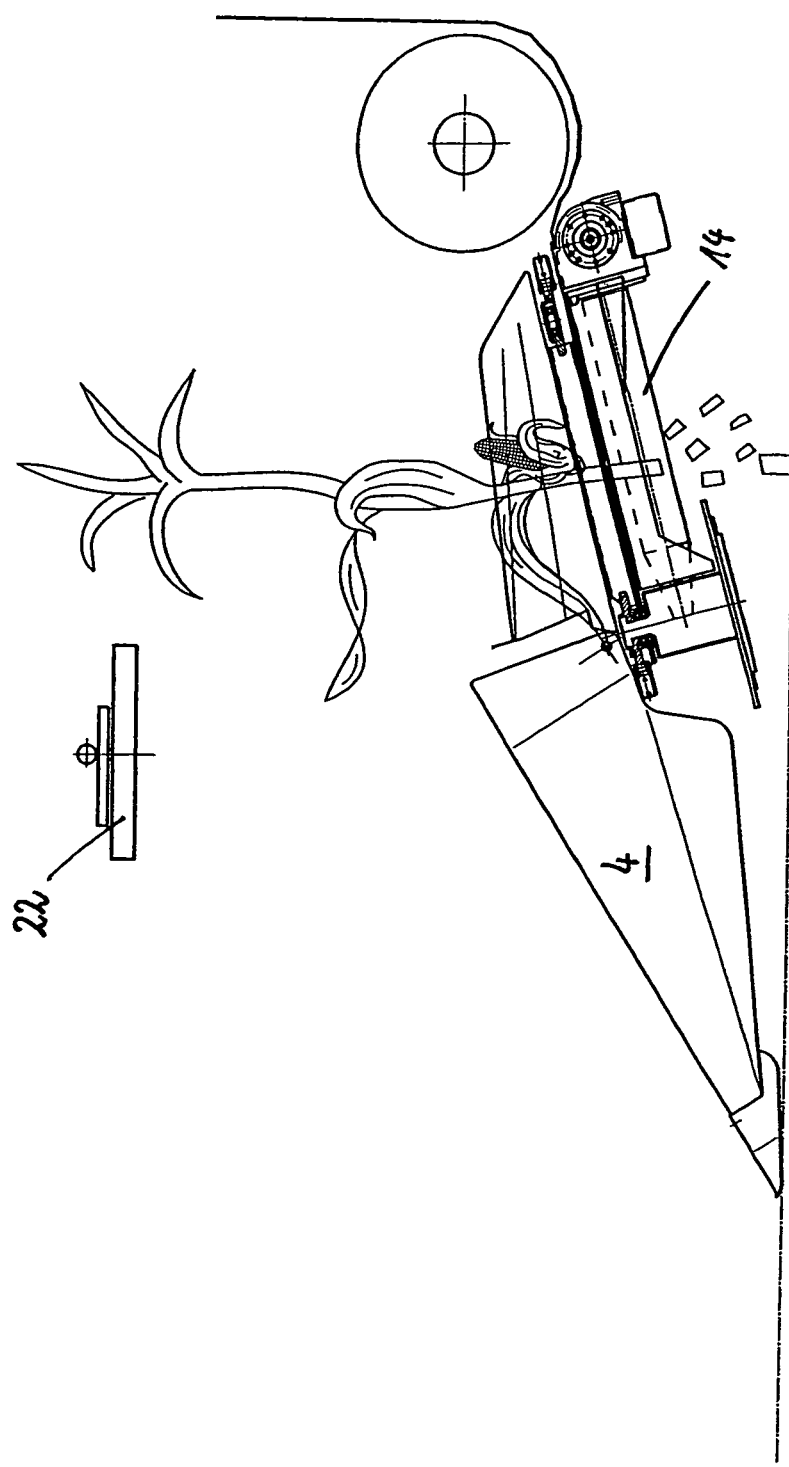

In the illustration of FIG. 5, the plant stalk has finally reached the picking unit 12 and is then pulled by the picking roller 14 in downward direction. In this phase, it is no longer necessary to support the plant stalk by the stalk support 22. The corncob or other infructescence can be separated in a conventional way from the stalk and conveyed away.

Figure 6:
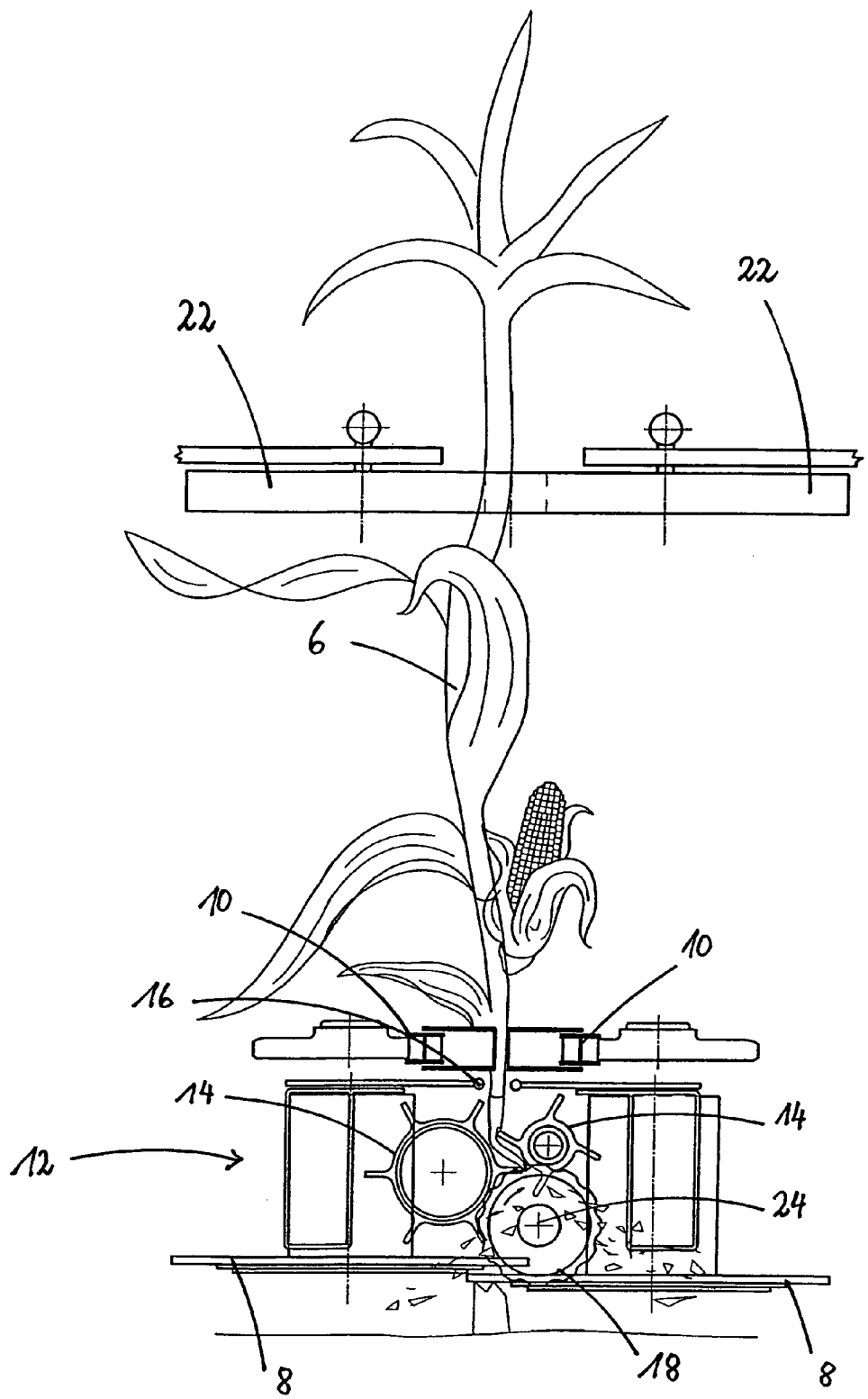
FIG. 6 a picking process in a view from the front.

FIG. 6 shows a picking unit 12 in a front view during a picking process. Vertically spaced from the picking unit 12 there are two stalk supports 22 which are partially meshing with each other and each cover a partial working width to the right and to the left of the picking gap 16 and thus cover the longitudinal center axis of the corresponding picking unit 12. The view of FIG. 6 also shows that the plant stalk cannot fall forwardly in the travel direction out of the attachment device 2.

Figure 7:
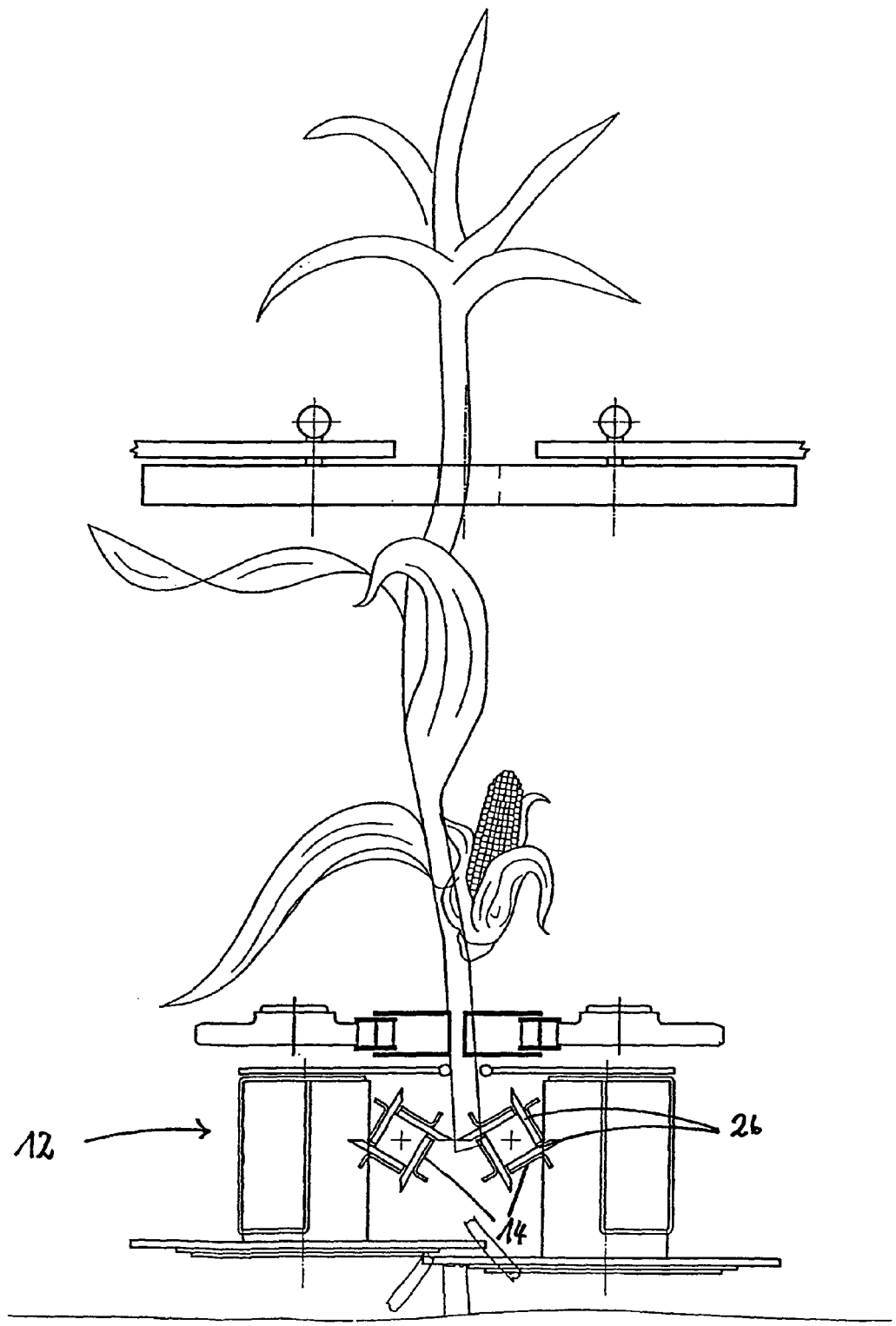
FIG. 7 a modified version of the milling technology illustrated in FIG. 6.

The milling device 18 illustrated in FIG. 6 has rotating knives in the form of several knife disks that are arranged in a spaced-apart arrangement relative to each other on a shaft 24 that is positioned parallel to the picking gap 16; the cutting edges of the knife disks project into the circular envelope curve of one or several of the picking rollers 14 as pulling-in rotors. The cutting devices 8 that partially overlap each other and in this way cover a greater partial working width are arranged below the plane of the picking rollers 14. FIG. 7 shows a modification of the version illustrated in FIG. 6 in which the moved knives 26 are positioned directly on the picking rollers 14.

Figure 8:
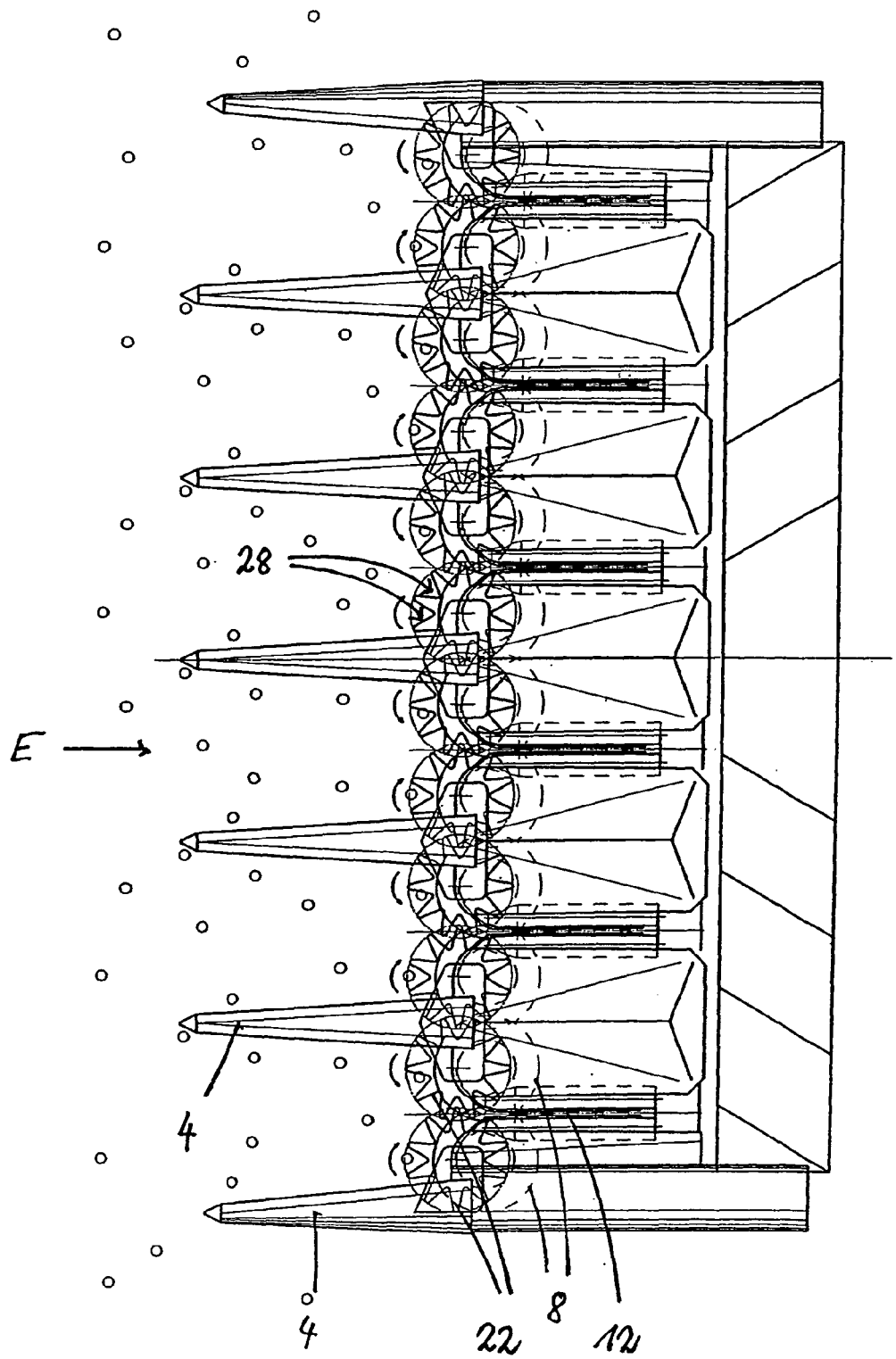
FIG. 8 a view onto an attachment device from above.

In FIG. 8 an attachment device is shown in a view from above. In this view, it can be seen well that the attachment device has a total of six picking units 12 that are arranged adjacent to each other. Each one of the picking units 12 has correlated therewith two oppositely driven stalk supports 22 and two rotating or stationary knife disks of cutting devices 8 which in the illustration are shown only by dashed lines. It can be seen well that the cutting devices 8 in the pulling-in direction E are positioned downstream of the stalk supports 22. In front of the attachment device 2, a number of plant stalks of the stem material 6, indicated by small circles, are positioned that are to be harvested. In front of the picking units there are stem dividers 4 which are very narrow in order not to collide with the major portion of the incoming material to be harvested. Only where the plant stalks in the border area between two neighboring picking units 12 come into the active area of the attachment device 2, a stem divider 4 assigns the respective plant stalk to one or the other picking unit.

In the view from above, also the receiving pockets 28 at the circumference of the stalk supports 22 can be seen. At some locations of the drawing it can be seen that the plant stalks enter the receiving pockets of the stalk supports 22. By the rotational movement of the stalk supports 22 these plant stalks are immediately engaged by the appropriate stalk support 22 and conveyed toward the picking unit 12. In the view from above it can be seen that the stalk supports 22 cover almost the entire working width of the attachment device 2.

Figure 9:
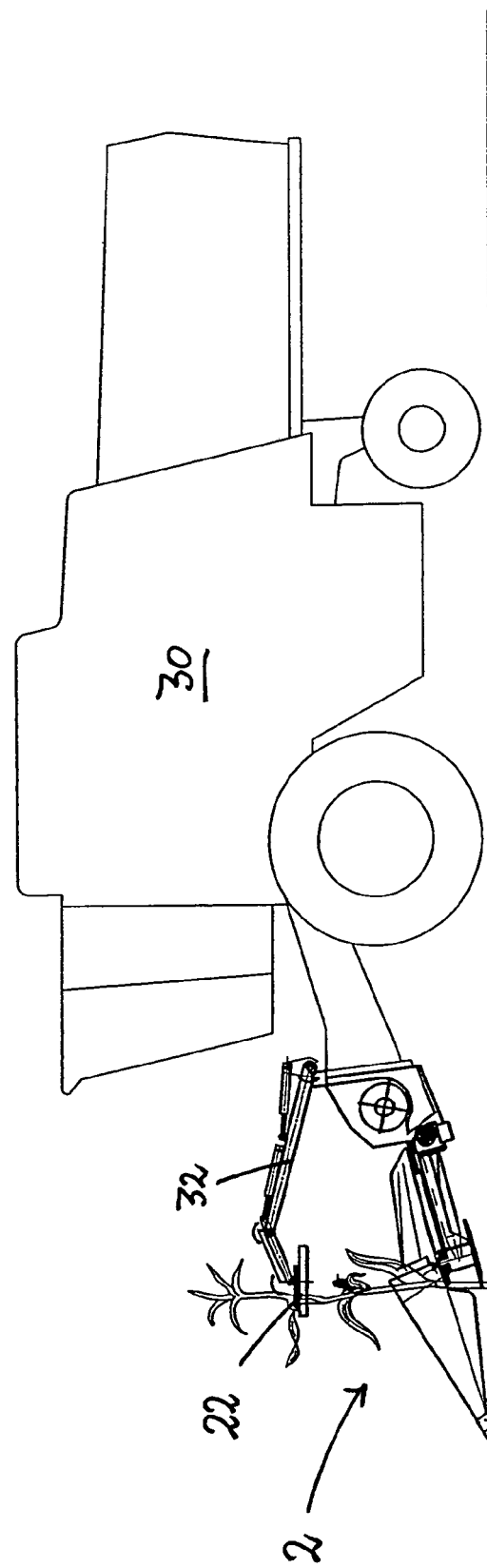
FIG. 9 a side view of an attachment device attached to a harvester.

In FIG. 9, an attachment device 2 is shown that is attached to a harvester 30. The stalk support 22 is secured by a support arm 32 that is supported pivotably. By means of hydraulic cylinders or comparable adjusting devices, the stalk support 22 is movable in the longitudinal direction and/or its vertical position and/or its attack angle and/or is adjustable with regard to its rotary speed. Accordingly, the stalk support 22 can be easily adjusted to different harvesting conditions.

Figure 10:
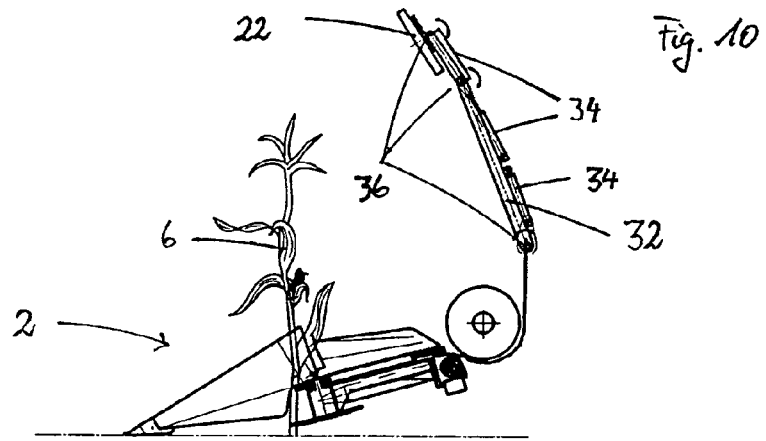
FIGS. 10-13 different positions of a stalk support.
Figure 11:
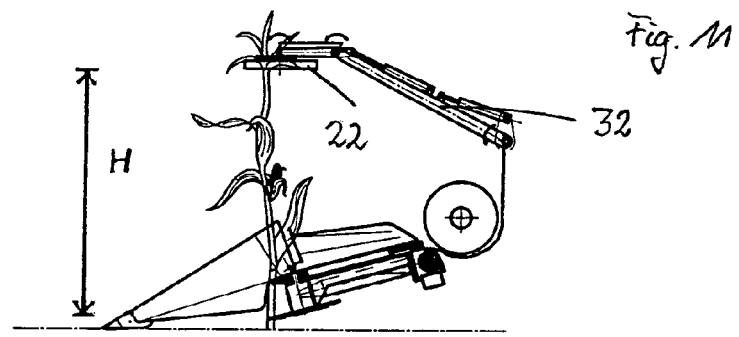
Figure 12:
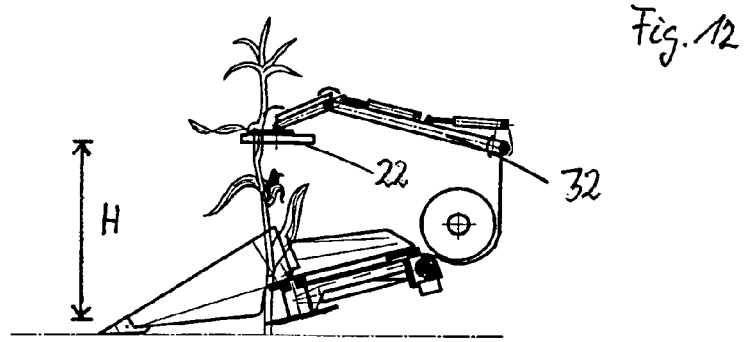
Figure 13:
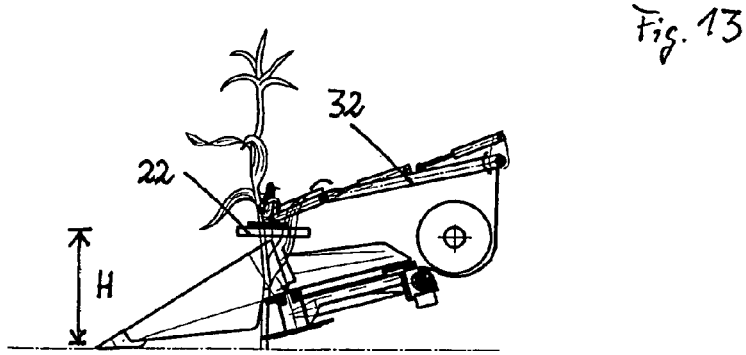

In FIG. 10, the stalk support 22 is shown in an upwardly pivoted position in which it cannot come into contact during harvest with the stem material 6 to be harvested. The support arm 32 in the embodiment is configured with two legs and by means of three hydraulic cylinders 35 is adjustable about three axes of rotation 36. In FIG. 11, the stalk support 22 is secured by means of a changed adjustment of the support arm 32 at a vertical position H in which the stalk support can contact and support a plant stalk at its upper end. In FIG. 12, the stalk support 22 is secured at a lower vertical position H in which it supports the plant stalk at the lower end of the upper third of the plant stalk. In FIG. 13, the stalk support 22 is finally shown at such a low vertical position H that it supports the plant stalk immediately below an infructescence of the stem material 6.

Figure 14:
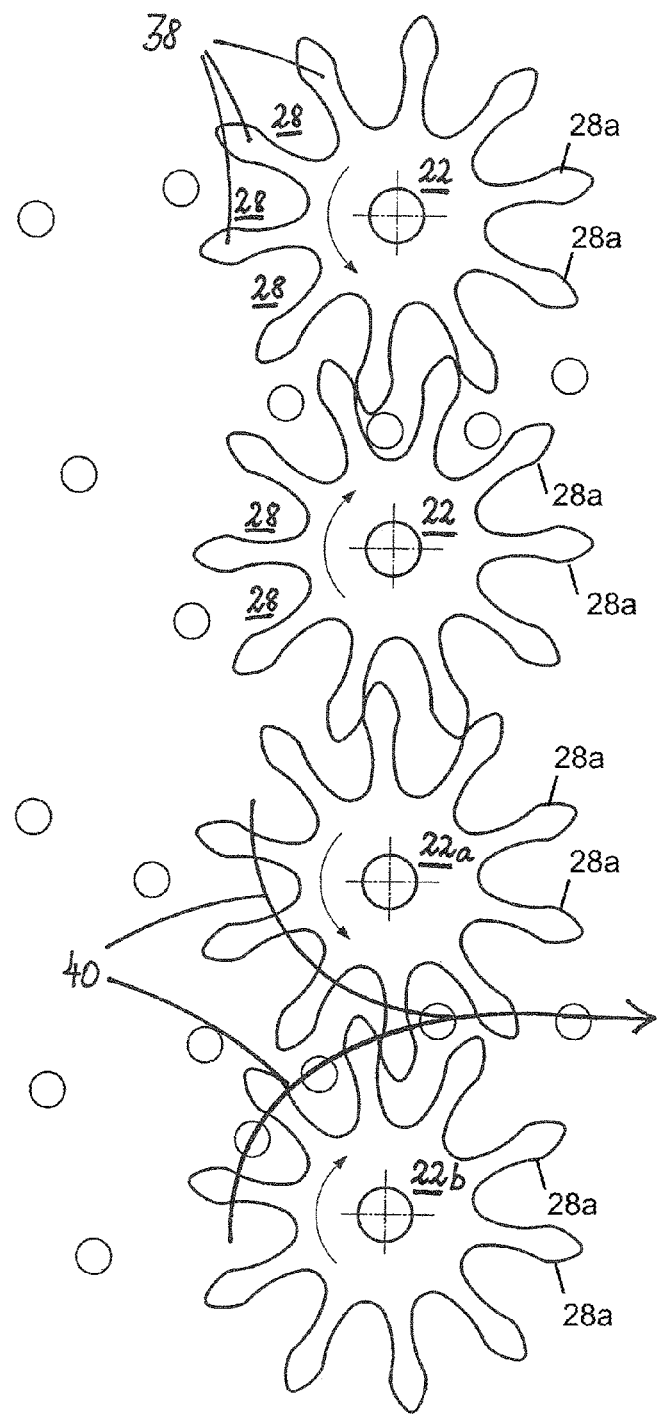
FIG. 14 a view onto several stalk supports from above.

In FIG. 14, four stalk supports 22 are shown in a view from above that form two pairs of oppositely driven stalk supports. Each stalk support 22 defines, by means of the receiving pockets 28 that are separated from each other by projections 38 and its respective movement path, a conveying path 40 across which the plant stalks can be conveyed and supported. In FIG. 14, the respective conveying paths 40 for the stalk supports 22a and 22b are indicated. In the embodiment, the conveying paths 40 of the two stalk supports 22a, 22b overlap each other because the envelope curves of the two stalk supports 22a, 22b partially overlap and the projections 38 partially mesh with each other. On the side of the receiving pockets 28 that is trailing in the rotational direction a projection 28a is provided which is formed to be leading in the rotational direction. Along the conveying path 40 of the stalk support 22b, by means of the circles illustrated in the receiving pockets 28 and representing the plant stalks, it is shown how the plant stalks are received in the receiving pockets 28 and remain supported during rotation of the stalk support 22b in the indicated rotational direction along the conveying path 40 in the receiving pockets 28 and, finally, after having been engaged by the other conveying devices of the attachment device 2, remain in the attachment device 2 behind the stalk support 22b in the pulling-in direction E, even without support action by the stalk support 22b.

The invention is not limited to the afore described embodiment. A person of skill in the art will have no difficulty in modifying the invention in a way that appears suitable to him by using his knowledge in the art and in adapting it thereby to a concrete situation without thereby avoiding the utilization of the subject matter of the invention.

What is claimed is:
1. An attachment device for harvesting stalky stem material, the attachment device comprising:
stem dividers;
cutting devices for cutting the stalky stem material;
conveying devices for conveying the cut stalky stem material;
picking units distributed across a working width of the attachment device, the picking units each comprising at least one picking roller and a picking gap, wherein the picking units are adapted to separate fruit from stalks of the stalky stem material;
milling devices, wherein each one of the picking units has a milling device associated therewith;
a device for collecting and combining the fruit separated from the stalks;
drivable stalk supports, wherein the picking units each have at least one of the drivable stalk supports correlated therewith, wherein the stalk supports, in a travel direction of the attachment device, are arranged upstream of the picking units and positioned in a vertical position vertically spaced relative to the picking units and to the cutting devices;
pivotable support arms supporting the stalk supports;
wherein the stalk supports are adapted to be moved by the support arms in a longitudinal direction and/or with respect to the vertical position and/or with respect to an attack angle and/or adjusted with respect to their rotary speed;
wherein the stalk supports each are embodied as a rotating circular disk comprising receiving pockets separated from each other by projections and distributed about a circumference of the rotating circular disks, respectively, wherein the rotating circular disks are arranged neighboring each other such that the projections of the rotating circular disks neighboring each other mesh with each other.

2. The attachment device according to claim 1, wherein, in the travel direction of the attachment device, the stem dividers are arranged upstream of the stalk supports with at least a partial length of the stem dividers and the cutting devices are arranged downstream of the drivable stalk supports.

3. The attachment device according to claim 1, comprising a motor that is hydraulically or electrically operated and operatively connected with at least one of the stalk supports, wherein a supply line for a drive action supply of the motor with hydraulic or electric energy is positioned along the support arm of said at least one of the stalk supports.

4. The attachment device according to claim 1, wherein the stalk supports are positioned such that the vertical position is above the fruit of the stalks.

5. The attachment device according to claim 1, wherein, upon a conveying movement, the stalk supports move the stalks supported by the stalk supports along a conveying path that is predetermined by the stalk supports toward the correlated picking units.

6. The attachment device according to claim 5, wherein the stalk supports and the conveying path defined by the stalk support are adjusted in a spatial position in relation to the cutting devices such that the stalks supported by the stalk supports along the conveying path are supported prior to, during, and after a cutting process by the cutting devices.

7. The attachment device according to claim 1, wherein the cutting devices cover at least almost an entire working width of the attachment device in the travel direction.

8. The attachment device according to claim 1, wherein the conveying devices cover at least almost the entire working width of the attachment device in the travel direction.

9. The attachment device according to claim 1, wherein the stalk supports, viewed in a pulling-in direction of the stalks into the attachment device, are arranged downstream of a tip of the stem dividers.

10. The attachment device according to claim 1, wherein the stalk supports are arranged in pairs of two oppositely drivable stalk supports and each of the pairs is associated with one of the picking units and covers a partial working width of the attachment device to the right and to the left of a longitudinal center axis of the said associated picking unit.

11. The attachment device according to claim 10, wherein the two oppositely drivable stalk supports each have a movement path defining an envelope curve and wherein the envelope curves partially overlap each other.

12. The attachment device according to claim 1, wherein a conveying speed of the stalk supports is identical to or greater than an advancing speed of the attachment device.

13. The attachment device according to claim 1, wherein the receiving pockets have a side that is trailing in a rotational direction of the stalk supports and wherein on said side a projection is formed that is leading in the rotational direction.

14. The attachment device according to claim 1, wherein the milling devices each have rotating knives with cutting edges, wherein the rotating knives are arranged on a shaft that extends parallel to the picking gap and the cutting edges project into an envelope curve of the at least one picking roller.

15. The attachment device according to claim 1, wherein at least one of the stalk supports has one or several bodies of rotation rotatably driven about an at least approximately vertical axis of rotation.

* * * * *